2,743,993
PROCESS FOR DYEING ACRYLONITRILE-CONTAINING TEXTILE ARTICLES

William W. Rankin, Charleston, W. Va., assignor to Union Carbide and Carbon Corporation, a corporation of New York No Drawing. Application August 23, 1952, Serial No. 306,058

14 Claims. (Cl. 8—55)

This invention relates to the dyeing of textile articles formed from or containing filaments and fibers made of acrylonitrile-containing polymers. It has especial utility for the dyeing of articles formed from polyacrylonitriles and from copolymers of acrylonitrile with a wide range of other polymerizable unsaturated compounds containing an olefinic double bond, such as vinyl chloride, vinyl acetate, methyl methacrylate, 2-vinylpyridine, acrylamide, alpha-methacrylamide, and mixtures of such polymers and/or copolymers.

In recent years important advances have been made in the art of dyeing articles made from dye-resistant acrylonitrile-containing resinous polymers by a novel and commercially practicable process wherein textiles and other articles made from such polymers and from mixtures thereof are treated with an aqueous solution containing a small amount of a compound yielding cuprous ions. This so-called "copper technique" of dyestuff application is believed to represent the first commercially practicable method for dyeing articles made from acrylonitrile-containing resinous polymers to deep shades with acid-type, direct-type and water-soluble acetate-type dyestuffs.

Prior to the present invention the copper-dyeing technique could not safely be applied to the dyeing of these articles with the well-known class of water-dispersible acetate-type dyestuffs which often possess outstanding light-fastness. This appears to be due to a chemical reaction between the dyestuff and the copper compound which precipitates in the dyebath as a scum which appears to be a complex of the dyestuff and copper. Articles dyed in such a bath have an extremely muddy, unsatisfactory appearance. Under some conditions the scum may block penetration by the dye liquor so that portions of the article remain more or less undyed. Consequently, it has not been practical to employ the advantageous copper-dyeing technique for dyeing such articles with the water-soluble dyestuffs of the aforesaid types where, concurrently therewith or subsequently thereto, a dyeing with a water-dispersible acetate-type dyestuff was desired.

The present invention is based in important part on applicant's discovery that textile and other articles made from the aforesaid resinous acrylonitrile-containing polymers and copolymers effectively can be dyed using dyebaths containing one or more water-soluble dyestuffs of the class of acid-type, direct-type and water-soluble acetate-type dyestuffs in conjunction with one or more water-dispersible acetate-type dyestuffs by proceeding in the manner herein described. This is an important discovery in view of the known difficulties encountered in attempts to use the well-known water-dispersible acetate-type dyestuffs in dyebaths containing copper compounds.

The use of mixtures of the water-dispersible acetate-type dyestuffs with water-soluble dyestuffs of the types herein described provides important advantages in dyeing articles made from acrylonitrile-containing polymers since the former have excellent leveling qualities and good wash-fastness and, with proper selection of the dyestuff, provide a dye formula of excellent light-fastness. Acid-type dyes applied by the present process have outstanding wash-fastness and lightfastness, these properties varying with the dyes selected. Usually, less dyestuffs is required for heavy color shades with the acid-type dyes than with the water-dispersible acetate-type dyes. Pastel shades are simple to obtain and do not require dye assistants. Mixtures of acid-type and water-dispersible acetate-type dyestuffs applied by the present process are particularly effective where heavy shades with excellent wash-fastness and light-fastness are required.

Among the more important objects of the invention are the following: to provide in novel manner for the dyeing of textiles and other articles made from resinous acrylonitrile-containing polymers with one or more water-dispersible acetate-type dyestuffs in admixture with one or more water-soluble dyestuffs of the acid-type, direct-type and/or water-soluble acetate-type; to provide, in the dyeing of such articles with mixtures of these water-soluble and water-dispersible dyestuffs by a form of modified "copper technique," for controlling the exhaustion of the dyestuff and improving the appearance and shade of the dyed article while minimizing the amounts of dyestuffs and copper compound required to yield a dyed article of a desired color shade; and to provide, in the dyeing of such articles by a process involving the use of a cuprous compound, for making available in the dyebath in active available form only approximately the amount of copper compound required to impart the desired color shade to the article being dyed.

According to one modification of the present invention, a textile or other article made from or containing a resinous acrylonitrile-containing polymer of the aforesaid type is introduced into an aqueous dyebath in a bath to article weight ratio of between 10 and 100 parts of water to one part of the article. The dyebath contains a mixture of one or more water-dispersible acetate-type dyestuffs together with one or more water-soluble dyestuffs of the class consisting of acid-type, direct-type and water-soluble acetate-type dyestuffs. The dyebath also may contain, when desired, a dispersing and leveling agent, and/or a swelling and penetrating agent for the resin. The dyebath then is slowly raised to a temperature of at least 175° F. and preferably to a boil, and dyeing at such temperature is contained for a time sufficient to fix the water-dispersible acetate-type dyestuffs in the fibers. This commonly requires around 30 minutes or more. Concentrated sulfuric acid or the equivalent then is added as needed to bring the pH of the dyebath within the range between 2.0 and 7.0, and preferably around 6, and heating is continued at temperatures within the range from around 175° F. to around the boiling point of the bath or higher for a brief period, usually around 15 minutes. Then while maintaining the temperature within that range there is slowly added to the dyebath, preferably dropwise, over a period of 10 to 15 minutes or more, small successive amounts of a solution of a cuprous compound, or of an aqueous liquid containing a cupric compound and sufficient of a dilute aqueous solution of a reducing agent for that compound to produce cuprous ions in the solution at a slow rate, while minimizing the further conversion of such ions to forms of copper ineffective in the process. The dyeing then is continued at temperatures around 175° F. or above, and preferably at the boiling point of the dyebath, until the desired shade of color is achieved in the article, or until the dye is exhausted.

Additional dyestuff can be added to the bath if and as desired, since there is never present therein such an excess of cuprous ions as to precipitate the dye prematurely. Usually, for best results, the dyeing is continued, after the addition of the copper compound has been completed, for a total of at least 30 minutes at the dyeing temperature.

The amount of cuprous compound or the equivalent employed depends in considerable degree upon the depth of color desired. Full uniform color shades are commonly secured using dyebaths containing 0.8% and less of the cuprous ions, while for light shades the bath may contain as little as 0.04% of the cuprous ions.

By adding the liquid containing cuprous ions to the dyebath in small successive increments, not only are remarkably uniform and scum-free dyeings obtained but in many cases substantially less dyestuff is required to obtain color shades equal in depth to those obtained when the liquid containing cuprous ions was added en masse to the bath prior to the dyestuff; and excess copper which might impair the light-fastness of the dyed article is avoided. Moreover, a high degree of control is secured over the final shade or depth of color of the dyed article not heretofore obtainable, thus permitting exceedingly close shade matches.

In the interest of securing optimum color values, light-fastness, etc., it is preferred to use the cupric compound and the reducing agent in the weight ratios of 1:0.4 in closed systems, and in the ratios of 1:0.6 in open systems where the article being dyed may be exposed for a considerable time to the open air.

If desired, delustering of the article in the dyebath is minimized by the addition to the dyebath of around 40% to 200% or more of an alkali metal sulfate, based on the weight of the article, at any stage of the dyeing operation—note Examples 1 and 5—and particularly after the addition of the cuprous compound has been completed. The dyed article then is scoured in well-known manner at around 140° F. in a dilute solution containing a detergent, is rinsed with water, and then is air dried at temperatures commonly around 160° F. If necessary, the dyed article may be further relustered by heating the dry article at 240° F. to 250° F. with dry heat for a brief period.

A wide range of swelling or penetrating agents for the resin of the article effectively can be used in the dyebath when desired. Particularly effective are derivatives of diphenyl and of benzlphenyl containing one or more hydroxy groups attached to a carbon atom or atoms of an aromatic ring or rings. Such compounds also can contain one to two chlorine atoms attached to a carbon atom or atoms of the same or different aromatic rings. Among suitable compounds are the o-, m-, and p-phenylphenols, the o,o'-, o,p'-, and m,m'-biphenols, p-benzylphenol, p,p'-dihydroxydiphenylmethane, and the p,p'-dihydroxydichlorodiphenylmethanes. Such swelling agents, when used, can be added to the dyebath conveniently in the form of their alkali metal salts in alkaline solution prior to acidification of the bath. P-phenylphenol, a representative solvent assistant, is highly effective in proportions around 1% to 15% of the dry weight of the article being dyed. When only medium or light shades of color are desired in the dyeings, a swelling agent for the resin fiber is not required, and ordinarily is not used.

It often is desirable to have present in the dyebath from 1% to 3% or more of a dispersing and leveling agent, preferably one of the cationic or of the anionic type. Highly effective for the purpose are the water-dispersible cationic products of the condensation of ethylene oxide with an organic amine. Such a product now is being marketed under the trade name, "Peregal OK." Such products can be made by the process disclosed in United States Patent No. 2,214,352.

The liquid mixture containing cuprous ions employed in the process conveniently can be made by mixing, preferably at room temperature, a dilute aqueous solution of a cupric compound such as cupric sulfate, chloride, acetate or formate, containing a small amount, e. g., from 0.1% to 1.0% or more, of a reducing agent for the copper compound, both based upon the weight of the liquid mixture. Preferred reducing agents include the metal formaldehydesulfoxylates, such as the zinc and the alkali metal formaldehydesulfoxylates, hydroxylamine sulfate and dihydrazine sulfate. Glyoxal also is a useful reducing agent in the process. The solution of the reducing agent should be present in amount sufficient to reduce at least the major portion of the cupric compound to the cuprous form. The treating mixture preferably is employed shortly after its preparation.

Should exhaustion of any of the dyestuffs occur at any stage of the dyeing operation, additional dyestuff can be added without objectionable effect upon the dyed article, since at no stage in the present dyeing process is there present an injurious excess of the copper compound and/or reducing agent.

The following examples serve to illustrate the invention. In the examples, and throughout the specification and claims, all parts are given in terms of weight and all percentages are based upon the dry weight of the article being dyed, unless otherwise specified. Each dyebath had a pH within the range from 2.0 to 7.0 during the dyeing in the presence of the cuprous compound.

EXAMPLE 1

A quantity of staple fiber spun from a resinous copolymer of acrylonitrile and vinyl chloride containing 40% of acrylonitrile in the polymer and having a specific viscosity at 20° C. of about 0.26 was scoured in an aqueous solution of a detergent. It then was treated for about 10 minutes at room temperature in an aqueous bath containing 1% of sodium hexametaphosphate and 2% of a sodium alkyl aryl sulfonate being marketed under the trade name, "Nacconol NR." The weight ratio of the bath to dry fiber was 15 to 1. To this bath then were added 6% of Anthraquinone Blue SWF 150%, a water-soluble acid-type dyestuff of Prototype No. 12; 4% of Eastman Fast Yellow 4RLF, and 2% of Eastone Fast Red GLF, the latter two being water-dispersible acetate-type dyestuffs. The temperature of the dyebath and contents was raised slowly to a boil over a period of 15 minutes and dyeing at this temperature proceeded for 30 minutes. Then 0.5% of concentrated sulfuric acid was added to adjust the pH of the dyebath to around 6.0 After about 15 minutes there was slowly added dropwise to the boiling dyebath a mixture containing cuprous ions previously prepared by mixing at room temperature (about 70° F.) an aqueous solution containing 2% of cupric sulfate, based on the dry fiber weight, in 50 times its weight of water, and an aqueous solution containing 0.8% of zinc formaldehydesulfoxylate, based on the fiber weight, in 50 times its weight of water.

After addition of this mixture was completed, the dyeing was continued at the boil for 30 minutes, following which 200% of anhydrous sodium sulfate was slowly added, and dyeing continued for another 30 minutes. The dyed fibers were scoured and then air dried at 160° F. for 60 minutes. The fibers had an excellent, uniformly full navy blue shade which showed good wash- and crockfastness.

EXAMPLE 2

Five pounds of staple fibers of the kind recited in Example 1 were scoured and then treated at room temperature for 10 minutes in a stock dyeing machine of 5 pounds capacity with 15 times its dry weight of an aqueous bath containing 1% of sodium hexametaphosphate and 2% of "Nacconol NR." The bath then was heated to 100° F. and the following dyestuffs added: 6% of Anthraquinone Blue SWF 150%, an acid-type dyestuff; 4% of Eastman Fast Yellow 4 RLF; and 4% of Eastone Fast Red GLF, the last two being water-dispersible acetate-type dyestuffs. After heating the dyebath to 210° F. for 40 minutes to fix in the fiber the water-dispersible dyestuff, 0.5% of concentrated sulfuric acid was added thereto. The dyeing was continued at the boiling point for 15 minutes, after which there was slowly added dropwise a mixture containing cuprous ions, prepared in the manner described in Example 1. After continuing the dyeing at the boiling temperature for another hour, 200% of anhydrous sulfate was added slowly and the dyeing continued for 30 minutes at the boil. The fiber then was scoured, and was dried at 248° F. for 15 minutes. The fibers were dyed to a uniformly full shade, and showed good wash-fastness and crock-fastness.

On the other hand, in another experiment conducted under the conditions described in Example 2, excepting that the aqueous mixture containing the cuprous ions was added rapidly in bulk to the aqueous dyebath containing the fibers and the mixture of dyestuffs after addition of the sulfuric acid and while at 100° F., and thereafter the bath was heated to the boiling point, the fibers were not dyed to a full shade, and the cleanup of the dyestuff on the surface of the fibers was poor due to dyestuff precipitation.

EXAMPLE 3

Fifty pounds of staple fiber stock of the type described in Example 1 were placed in a Smith-Drum stock dyeing machine with water in a water to dry stock ratio of 15 to 1. Two per cent of "Nacconol NR" and 1% of sodium hexametaphosphate were added to the bath, followed by 6% of Anthraquinone Blue SWF 150%, 4% of Eastman Fast Yellow 4RLF, and 4% of Eastone Fast Red GLF in aqueous solutions. The dyebath was raised to 210° F. and held there for 30 minutes, at which time 0.5% of concentrated sulfuric acid was added, and the dyeing continued for 15 minutes. An aqueous mixture containing cuprous ions, prepared in the manner described in Example 1, with the exception that the solutions of the copper compound and reducing agent were mixed at 120° F., then was added dropwise to the boiling bath during 15 minutes, and the dyeing was continued for another 30 minutes. Then 200% of sodium sulfate was added slowly. Dyeing at the boil was discontinued after another hour. A test portion of the dyed fiber was scoured and then dried at 248° F. for 15 minutes. The resultant stock was dyed level, and the cleanup of the dye at the surface of the fiber was excellent.

EXAMPLE 4

This illustrates how the color shade of the dyed material can be deepened through appropriate additions to the dyebath of various dyestuffs and/or of cuprous compounds or mixtures containing cuprous ions during the dyeing operation.

The dyebath and contents described in Example 3, remaining after removal of the test portion of fiber mentioned in that example, were heated to 210° F., 1% of Eastman Fast Yellow 4RLF and 2% of Eastone Fast Red GLF were added thereto, and heating continued for 30 minutes. Thereafter the color shade of the fiber again was deepened by the addition of 1% of Anthraquinone Blue SWF 150%, followed by the slow addition during 15 minutes to the bath, maintained at 210° F., of a liquid containing cuprous ions, and prepared by mixing together an aqueous solution containing 0.25% of cupric sulfate and one containing 0.1% of zinc formaldehydesulfoxylate. The dyeing was continued for 30 minutes, after which, in order to deepen the color shade still further, there were added to the hot dyebath 1% of Anthraquinone Blue SWF 150% and 0.5% of Eastman Fast Yellow 4RLF. Fifteen minutes thereafter a mixture containing cuprous ions, freshly made by mixing an aqueous solution containing 0.15% of cupric sulfate with an aqueous solution containing 0.07% of zinc formaldehydesulfoxylate, was added dropwise to the dyebath held at 210° F. until the desired shade was attained. An additional 200% of sodium sulfate was added to the dyebath to reluster the dyed fiber, and the heating continued for 30 minutes. The fiber then was scoured and dried as described in Example 2. The fiber was dyed to a level and uniform midnight blue shade. The fiber was free from precipitated or unfixed dyestuff.

EXAMPLE 5

Spun yarn made from a commercially available polyacrylonitrile fiber being marketed under the trade name, "Orlon, type 41," and said to contain over 85% and up to 100% of acrylonitrile in the polymer was first scoured and then placed in an aqueous bath at a bath to article weight ratio of 60 to 1. The bath containing 4% of Xylene Milling Blue GL (C. I. 833) an acid-type dye, and 4% of Celliton Fast Yellow GA, a water-dispersible acetate-type dye, Prototype 242, and 1% of "Peregal OK." Then 40% of sodium sulfate was added to the bath and the temperature was raised to 208° F. and dyeing carried out for 30 minutes. The pH of the bath then was lowered to 5.0 with sulfuric acid. Thereafter, during 30 minutes there was added dropwise to the dyebath a liquid containing cuprous ions prepared at room temperature as a dilute aqueous solution containing 0.25% of cupric sulfate and 0.125% of zinc formaldehydesulfoxylate, both by weight of the treating liquid, to obtain dyebath exhaustion. An amount of reduced copper corresponding to 1.6% of cupric sulfate, based upon the dry weight of the yarn, was required to give to the yarn the optimum color values. The dyeing proceeded at a uniform rate to the desired shade.

EXAMPLE 6

Following the procedure described in Example 5, a spun yarn made from a copolymer of acrylonitrile and vinyl chloride, having an acrylonitrile content of 68% and a specific viscosity at 20° C. of 0.41, was dyed at an even rate to the same desired green color. To secure optimum color value, reduced copper corresponding to 1.8% of cupric sulfate, based upon the weight of the dry yarn, was required.

EXAMPLE 7

Following the procedure described in Example 5, a quantity of staple fibers made from a copolymer of acrylonitrile and vinyl chloride having an acrylonitrile content of about 40% and a specific viscosity at 20° C. of about 0.26 was dyed uniformly to the desired green shade. In this case reduced copper ions corresponding to 1.2% of cupric sulfate, based upon the dry weight of the fibers, was required.

EXAMPLE 8

Following the method described in Example 5, a quantity of continuous filament yarn known under the designation, "X–51," and believed to be a coplymer of acrylonitrile with acrylamide, was readily dyed to a good green shade. For optimum color value and exhaustion of the dyestuff, reduced copper corresponding to 0.6% of cupric sulfate, based upon the dry yarn weight, was required.

EXAMPLE 9

Staple fibers made from a resinous copolymer of acryonitrile and vinyl chloride containing about 40% of acrylonitrile in the polymer and having a specific viscosity at 20° C. of about 0.26, were scoured and placed in an aqueous bath at a bath to fiber ratio of about 60 to 1. The bath contained 1% of "Peregal OK," 40% of sodium sulfate, 2% of Alizarine Direct Blue ARA, an acid dyestuff (Prototype 11), and 4.0% of Artisil Direct Orange 2R Conc., a dispersed acetate-type dye, Prototype 43. The bath temperature was raised to 208° F. and dyeing carried out for 30 minutes. The pH of the bath then was lowered to 5.0 with sulfuric acid. Thereafter there was slowly added dropwise to the dyebath, held at 208° F., a liquid containing cuprous ions prepared at room temperature as an aqueous solution containing 0.25% of cupric sulfate and 0.125% of hydroxylamine sulfate, both based on the weight of the said solution, until the desired shade of olive green was secured. The dyeing proceeded smoothly. Cuprous compounds in amount corresponding to 2.6% of cupric sulfate, based upon the weight of the dry fibers, were required to obtain the desired olive green shade.

EXAMPLE 10

Treating the staple fibers described in Example 9, and following the method described in that example, with the exception that the dyestuffs used were 2% of Anraquinone Blue RXO, an acid dye (C. I. 1076), and 4.0% of Celliton Fast Yellow GA, a dispersed acetate dye, Prototype 242, and the treating liquid was made at room temperature and consisted of an aqueous liquid containing 0.25% of cupric sulfate and as reducing agent 0.125% of dihydrazine sulfate, both based upon the weight of the treating liquid, the dyeing proceeded smoothly. To secure the desired shade of green color, 3.9% of cupric sulfate and 1.95% of dihydrazine sulfate, based upon the weight of the dry fiber, were required.

EXAMPLE 11

Treating the staple fibers described in Example 9, and following generally the procedure of that example, with the exception that the dyestuffs used were 2% of Anthraquinone Blue SWF 150% Conc., and 4% of Celliton Fast Yellow GA, and the dyebath also contained 10% of sodium p-phenylphenoxide as a penetrating agent, the pH of the bath was lowered to 6-7 before adding the dyestuffs. The fibers were added to this dyebath and the temperature raised to 175° F. and dyeing continued for 30 minutes. The pH of the bath then was lowered to a value of 4-5 with sulfuric acid and then there was added slowly dropwise thereto the liquid containing cuprous ions, made in the manner described in Example 5. The slow addition of the treating liquid was continued while heating at 175° F. until the desired color shade was secured. This required cuprous ions corresponding to 4.4% of cupric sulfate, based upon the dry weight of the fibers. The dyeing proceeded smoothly at all times.

Among the many dyestuffs useful in the process are the following:

*Acid-type dyestuffs*

| Trade name: | Color Index No. |
|---|---|
| Xylene Milling Blue BL | 833 |
| Vitrolan Orange R. Conc. | Pr. 146 |
| Xylene Milling Yellow P | ------ |
| Xylene Milling Yellow 2GP | ------ |
| Xylene Fast Red 2GP | ------ |
| Xylene Light Rubine 2GS | ------ |
| Calcoid Neutral Brown RS | ------ |
| Anthralan Red BA-CF | Pr. 210 |
| Chromaven Milling Orange G Conc. | 274 |
| Alizarine Light Brown BL | ------ |
| Alizarine Light Green GSN | ------ |
| Alizarine Light Gray RLL | ------ |
| Alizarine Light Red R | ------ |
| Alizarine Sky Blue BS-CF | 1088 |
| Alizarine Cyanine Green GHN-CF | 1078 |
| Brilliant Alizarine Light Red 4B | ------ |
| Sufonine Red G | 430 |
| Calcochrome Alizarine Gray 2BLS | Pr. 206 |
| Xylene Fast Rubine 3GP | Pr. 412 |
| Amacid Red 3B Conc. | 208 |
| Sulfonine Orange GS | Pr. 151 |
| Sulfonine Yellow 2G | 642 |
| Cloth Red G | 249 |
| Croceine Scarlet MOO | 252 |
| Anthraquinone Violet R | 1080 |
| Anthraquinone Blue SWF 150% | Pr. 12 |
| Supramine Yellow 3GLA-CF | Pr. 474 |
| Calcocid Milling Red 3R Conc. | 275 |

*Direct-type dyestuffs*

| Trade name: | Color Index No. |
|---|---|
| Calcomine Brilliant Yellow Conc. | 365 |
| Fastusol Brown LBR | ------ |
| Fastusol Red 4BA | 278 |
| Calcodur Yellow BL Conc. | 814 |
| Calcodur Yellow NN | 814 |

*Water-soluble acetate-type dyestuffs*

| Trade name: | Color Index No. |
|---|---|
| Solacet Fast Violet RS | ------ |
| Solacet Fast Yellow GS | ------ |
| Solacet Fast Scarlet B-125[1] | ------ |
| Solacet Fast Green 2GS | ------ |
| Solacet Fast Blue 2BS | ------ |
| Solacet Fast Orange 2GKS | ------ |
| Solacet Fast Red 5BGS | ------ |

[1] This dyestuff has the structure:

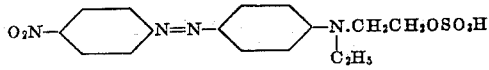

*Water-dispersible acetate-type dyestuffs*

| Trade name: | Color Index No. |
|---|---|
| Artisil Direct Orange 2R | Pr. 43 |
| Amacel Brilliant Blue B Ex. | Pr. 228 |
| Celliton Fast Yellow GA[2] | Pr. 242 |
| Celliton Fast Violet 6BA | Pr. 241 |
| Celliton Fast Red GGA Ex. Conc.[3] | Pr. 236 |
| Celliton Fast Rubine BA-CF | Pr. 238 |
| Eastman Fast Blue GLF | ------ |
| Eastone Fast Red GLF | ------ |

[2] This dyestuff has the following structure:

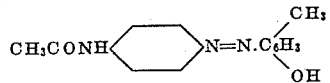

[3] This dyestuff has the following structure:

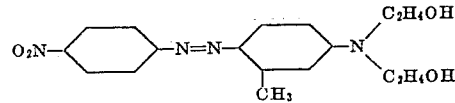

It will be understood that the dyeing can be conducted at temperatures above atmospheric in fluid-tight vats under pressure providing that the temperature is substantially below the strain-release temperature of the resin article, e. g., 250° F. The strain-release temperature is that temperature at which internal strains locked within the article are released, with resultant objectionable change in the shape of the article.

Variations in the order of the procedure of adding to the dyebath the various components, other than the copper-containing agent, can be made without departing from the invention. Also, the swelling agent, when used, can be added to the bath from a solution thereof in a suitable solvent, or it may be added in the form of a micronized powder.

It is important, for best results, that the dyeing with the water-dispersible acetate-type dyestuffs be begun and substantially completed in the absence of a cuprous compound and that, if it is found necessary or desirable to add additional quantities of such a dyestuff during the dyeing operation, the dyebath should be substantially depleted of the cuprous compound at the time of such addition thereto. On the other hand, the water-soluble dyestuffs herein described may be present at any or all stages of the dyeing operation.

The specific viscosities of the resins referred to herein were determined at 20° C. using an Ostwald viscosimeter in accordance with the formula:

Specific viscosity =
$$\frac{\text{Viscosity of a solution of 0.1 gram of the resin in 50 cc. of solvent}}{\text{Viscosity of the solvent}} - 1$$

In determining these specific viscosities, cyclohexanone was used with the resins of Examples 1 to 4, 7, and 9 to 11; and dimethylformamide was used with the resin of Example 6. The specific viscosity of the resin is a direct function of its average molecular weight.

The invention is susceptible of modification within the scope of the appended claims.

I claim:

1. Process for dyeing textile and other articles made from resinous polyacrylonitriles and copolymers of acrylonitrile with at least one other polymerizable compound containing a single olefinic double bond with a water-soluble dyestuff and a water-dispersible dyestuff, which comprises treating such an article for at least 10 minutes with an aqueous dyebath maintained at a temperature of from around 175° F. to a temperature near but substantially below the strain-release temperature of such article, said dyebath containing at least one water-dispersible acetate-type dystuff and at least one water-soluble dyestuff selected from the class consisting of the acid-type, the direct-type and the water-soluble acetate-type dyestuffs, thereafter adjusting the pH of the bath to between 2 and 7, and, while the dyebath is at a temperature within the said range, slowly adding thereto small successive amounts of an aqueous liquid containing cuprous ions until the article attains the desired shade of color.

2. Process for dyeing textile articles made from resinous polyacrylonitriles and copolymers of acrylonitrile with at least one other polymerizable compound containing a single olefinic double bond with a water-soluble dyestuff and a water-dispersible dyestuff, which comprises treating such an article for at least 10 minutes with an aqueous dyebath maintained at a temperature between around 175° F. and about 250° F. and containing at least one water-dispersible acetate-type dyestuff and at least one water-soluble dyestuff selected from the class consisting of the acid-type, the direct-type and the water-soluble acetate-type dyestuffs, thereafter adjusting the pH of the bath to between 2 and 7, and, while the dyebath is at a temperature within the said range, slowly adding thereto in small successive amounts a mixture of a dilute solution of a cupric compound and a dilute solution of a reducing agent for the latter in amount sufficient to form cuprous ions in the dyebath, and continuing the addition of the said mixture and the dyeing of the article at the said temperature until the desired shade of color has been attained therein.

3. Process for dyeing textile articles made from resinous polyacrylonitriles and copolymers of acrylonitrile with at least one other polymerizable compound containing a single olefinic double bond with a water-soluble dyestuff and a water-dispersible dyestuff, which comprises treating such an article for at least 10 minutes with an aqueous dyebath maintained at a temperature between around 175° F. and about 250° F. and containing at least one water-dispersible acetate-type dyestuff and at least one water-soluble dyestuff selected from the class consisting of the acid-type, the direct-type and the water-soluble acetate-type dyestuffs, thereafter adjusting the pH of the bath to between 2 and 7, and, while the dyebath is at a temperature within the said range, slowly adding thereto small successive amounts of a mixture containing a dilute solution of a cupric compound and of a reducing agent for the latter sufficient in amount to release in the dyebath at least 0.04% of cuprous ions, and continuing the addition to the dyebath of the said mixture and the heating of the article at the said temperature until the desired shade of color has been attained therein.

4. Process as defined in claim 3 wherein the reducing agent is a metal formaldehydesulfoxylate.

5. Process as defined in claim 1, together with a step of adding a water-soluble relustering agent to the dyebath prior to completion of the high temperature dyeing operation.

6. Process as defined in claim 1 wherein the said dyebath also contains a swelling agent for the resinous material.

7. Process for dyeing textile articles made from resinous polyacrylonitriles and copolymers of acrylonitrile with at least one other polymerizable compound containing a single olefinic double bond with a water-soluble dyestuff and a water-dispersible dyestuff, which comprises treating such an article for at least 10 minutes with an aqueous dyebath maintained at a temperature between around 175° F. and about 250° F. and containing at least one water-dispersible acetate-type dyestuff and at least one water-soluble dyestuff selected from the class consisting of the acid-type, the direct-type and the water-soluble acetate-type dyestuffs, thereafter adjusting the pH of the bath to between 2 and 7, and, while the dyebath is at a temperature within the said range, slowly adding thereto in small successive amounts a mixture of a dilute solution of a cupric compound and a dilute solution of a reducing agent for the latter in amount sufficient to form cuprous ions in the dyebath, continuing the addition of the said mixture and the dyeing of the article at the said temperature until the desired shade of color has been attained therein and, at any time prior to completion of the dyeing, adding to the dyebath a supplemental amount of a water-soluble dyestuff of the aforesaid class thereof.

8. Process for dyeing textile articles made from resinous polyacrylonitriles and copolymers of acrylonitrile with at least one other polymerizable compound containing a single olefinic double bond with a water-soluble dyestuff and a water-dispersible dyestuff, which comprises treating such an article for at least 10 minutes with an aqueous dyebath maintained at a temperature between around 175° F. and about 250° F. and containing at least one water-dispersible acetate-type dyestuff and at least one water-soluble dyestuff selected from the class consisting of the acid-type, the direct-type and the water-soluble acetate-type dyestuffs, thereafter adjusting the pH of the bath to between 2 and 7, and, while the dyebath is at a temperature within the said range, slowly adding thereto in small successive amounts a mixture of a dilute solution of a cupric compound and a dilute solution of a reducing agent for the latter in amount sufficient to form cuprous ions in the dyebath, and continuing the addition of the said mixture and the dyeing of the article at the said temperature until the desired shade of color has been attained therein and, at any time prior to completion of the dyeing other than the time during which the mixture containing the copper compound is being added to the dyebath, introducing into the dyebath a supplemental amount of a water-dispersible acetate-type dyestuff.

9. Process as defined in claim 8 wherein the said reducing agent is a metal formaldehydesulfoxylate.

10. Process as defined in claim 8 wherein the said reducing agent is dihydrazine sulfate.

11. Process as defined in claim 8 wherein the said reducing agent is hydroxylamine sulfate.

12. Process as defined in claim 8 wherein the copper compound and the said reducing agent are used in the weight ratios within the range between 1:0.4 and 1:0.6.

13. Process for dyeing textile articles made from polyacrylonitriles and copolymers of acrylonitrile with at least one other polymerizable compound containing a single olefinic double bond with a mixture of water-soluble and water-dispersible dyestuffs, which comprises treating such an article for at least 10 minutes with an aqueous dyebath maintained at a temperature between around 175° F. and its boiling point, and containing at least one water-dispersible acetate-type dyestuff and at least one water-soluble dyestuff selected from the class consisting of the acid-type, the direct-type and the water-soluble acetate-type dyestuffs, thereafter adjusting the pH of the bath to between 2 and 7, and, while the dyebath is maintained at a temperature within the said range, slowly adding thereto in small successive amounts an aqueous liquid containing cuprous ions until the desired shade of color has been attained.

14. Process as defined in claim 13 wherein a swelling agent for the resin article is added to the dyebath prior to the addition thereof of the liquid containing cuprous ions.

References Cited in the file of this patent

"Chemistry of Synthetic Dyes," by K. Venkataraman, vol. 2, pp. 812–815, published 1952, N. Y. C., by Academic Press.

Br. Rayon and Silk Journal for February 1954, p. 77.

Tech. Bulletin for March 1951, vol. 7, No. 1, published by Du Pont, Wilmington, Del., pages 45–52.

Rayon and Syn. Text. for December 1951, pages 62, 63.